United States Patent
Sohl

(10) Patent No.: US 9,303,682 B2
(45) Date of Patent: Apr. 5, 2016

(54) SHAFT ARRANGEMENT AND METHOD FOR PRODUCING A SHAFT ARRANGEMENT AND CONNECTING ELEMENT AS AN INITIAL PRODUCT

(75) Inventor: Carsten Sohl, Fredericia (DK)

(73) Assignee: Schäfer MWN GmbH, Renningen (DK)

( * ) Notice: Subject to any disclaimer, the term of this patent is extended or adjusted under 35 U.S.C. 154(b) by 107 days.

(21) Appl. No.: 14/116,972

(22) PCT Filed: May 10, 2012

(86) PCT No.: PCT/EP2012/058693
§ 371 (c)(1),
(2), (4) Date: Nov. 11, 2013

(87) PCT Pub. No.: WO2012/152891
PCT Pub. Date: Nov. 15, 2012

(65) Prior Publication Data
US 2014/0079482 A1    Mar. 20, 2014

(30) Foreign Application Priority Data

May 11, 2011    (DE) .......................... 10 2011 075 688

(51) Int. Cl.
*F16C 3/02*    (2006.01)
*F16D 1/02*    (2006.01)

(52) U.S. Cl.
CPC .................. *F16C 3/026* (2013.01); *F16C 3/023* (2013.01); *F16D 1/02* (2013.01); *F16C 2360/31* (2013.01); *Y10T 403/7075* (2015.01)

(58) Field of Classification Search
CPC ...... F16C 3/026; F16C 3/023; F16C 2360/31; F16D 1/02

USPC .......................................... 464/181; 156/172
See application file for complete search history.

(56) References Cited

U.S. PATENT DOCUMENTS

| | | | | |
|---|---|---|---|---|
| 4,185,472 A | * | 1/1980 | Yates et al. ...................... | 464/181 |
| 4,380,443 A | * | 4/1983 | Federmann et al. .......... | 464/181 |
| 5,558,738 A | * | 9/1996 | Rector .......................... | 156/175 |
| 5,683,300 A | | 11/1997 | Yasui et al. | |
| 2010/0113171 A1 | * | 5/2010 | Schreiber et al. ............. | 464/183 |
| 2011/0309631 A1 | | 12/2011 | Rebsdorf | |
| 2011/0309632 A1 | | 12/2011 | Rebsdorf | |

FOREIGN PATENT DOCUMENTS

EP    0044380 B1    3/1984
JP    63-166519 A    7/1988

OTHER PUBLICATIONS

International Search Report issued in connection with PCT Application No. PCT/EP2012//058693.
Written Opinion issued in connection with PCT Application No. PCT/EP2012//058693.

\* cited by examiner

*Primary Examiner* — Jeff Aftergut
(74) *Attorney, Agent, or Firm* — Akerman LLP

(57) ABSTRACT

A shaft arrangement for transmitting torques from a hub of a wind power plant to a generator has connecting elements at both ends for a mechanical connection. The connecting elements are each overlapped by end regions of a connecting shaft tube, wherein the shaft tube consists of a fibre composite material having a plurality of bundles of fibre. In the region overlapped by the shaft tube, the connecting elements have a plurality of protruding retaining pins about which and between which the bundles of fibre are placed and extend.

7 Claims, 5 Drawing Sheets

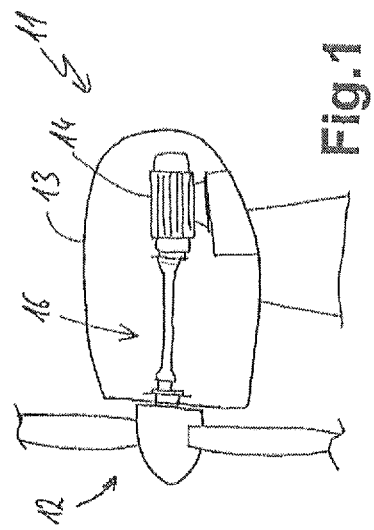
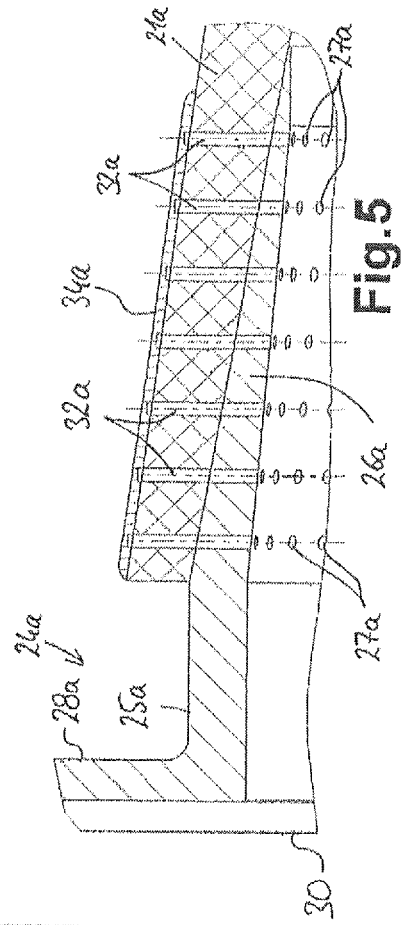
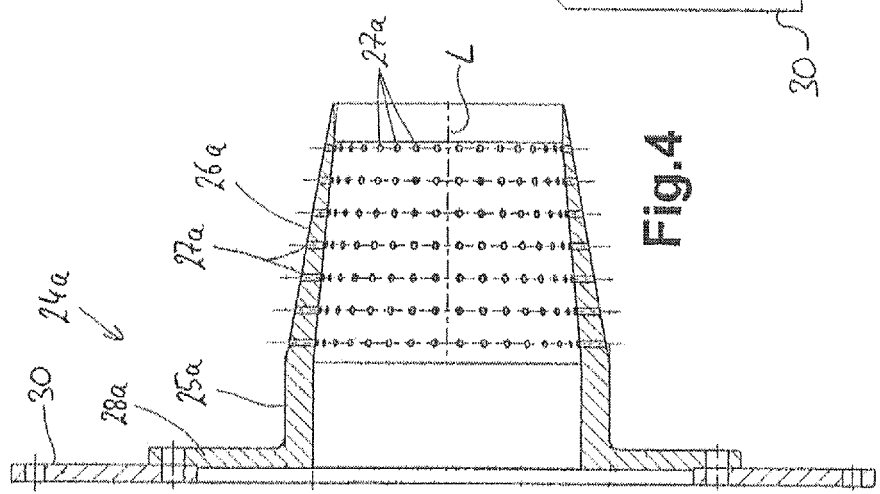

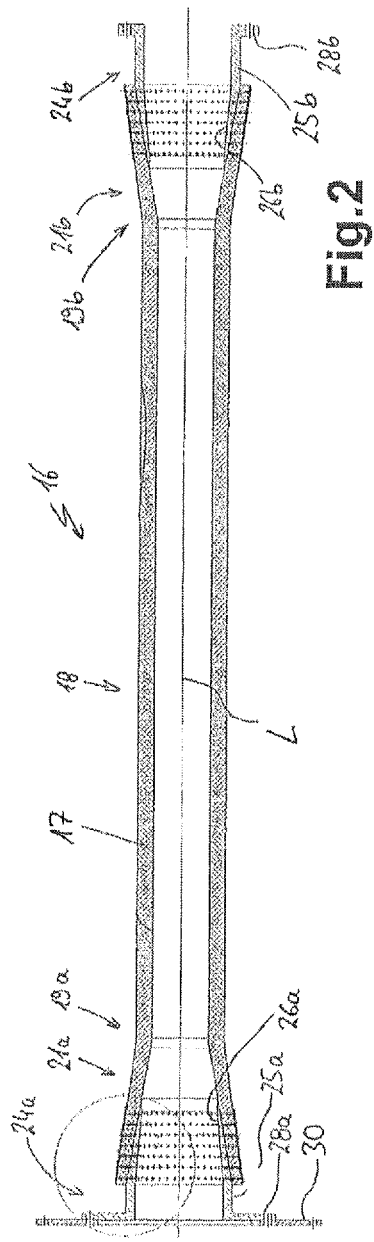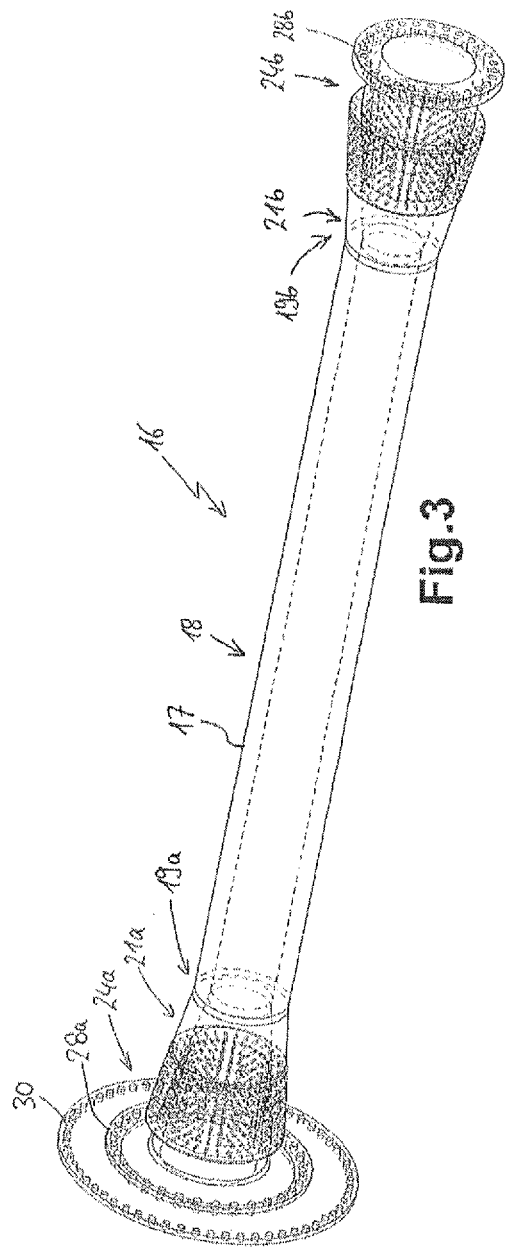

SHAFT ARRANGEMENT AND METHOD FOR PRODUCING A SHAFT ARRANGEMENT AND CONNECTING ELEMENT AS AN INITIAL PRODUCT

FIELD OF APPLICATION AND BACKGROUND OF THE INVENTION

This application is a national phase of PCT/EP2012/058693, filed May 10, 2012, and claims priority to DE 10 2011 075 688.4, filed May 11, 2011, the entire contents of which are hereby incorporated by reference.

The invention relates to a shaft arrangement for transmitting torque, and also to a method for producing such a shaft arrangement and to a connecting element as a semi-finished product for producing a shaft arrangement. Such a shaft arrangement is especially preferably used in wind power plants in order to connect a rotor hub to a generator.

In the case of the aforesaid intended purpose, very high demands are made on the shaft arrangement. On the one hand, the torque which is to be transmitted is very large in view of wind power plants with increasingly larger rotor diameters. At the same time, a shaft arrangement should be as durable as possible, or the maintenance cost for the shaft arrangement and its supporting and the like should be as low as possible since maintenance is naturally very costly in the case of wind power plants. Since increasingly more wind power plants are installed in coastal marine areas, their maintenance again becomes considerably more difficult.

Object and Solution

The invention is based on the object of creating a shaft arrangement which is referred to in the introduction and also a method for its production, with which problems of the prior art can be solved and in particular a shaft arrangement which is very stable and robust during continuous operation can be created, which shaft arrangement on the one hand can transmit high levels of torque and on the other hand especially has a certain twistability or torsion capability for absorbing torque peaks.

This object is achieved by means of a shaft arrangement with the features of claim 1 and also by means of a method for its production with the features of claim 15 or 17, and by means of a connecting element as a semi-finished product for producing a shaft arrangement with such a method with the features of claim 23. Advantageous and preferred embodiments of the invention are the subject of the further claims and are explained in more detail in the following text. In this case, many of the features are described only for the shaft arrangement or only for one of the methods for its production or for the connecting element as a semi-finished product. However, they are expected to be able to apply both to the shaft arrangement and to the production method regardless of this. The wording of the claims is created by explicit reference to the content of the description.

It is provided that connecting elements are provided at both ends of the shaft arrangement. By means of these, a mechanical coupling or connection can be carried out externally, namely to the hub of the rotor on one side and to the generator on the other side in the case of a wind power plant.

According to the invention, it is provided that the connecting elements of end regions of a central connecting shaft tube are overlapped in each case. This shaft tube consists of a fiber composite material with a multiplicity of fiber bundles which have been adhesively bonded by a resin or the like in a known manner. In this case, the connecting elements have a multiplicity of projecting retaining pins in the region which is overlapped by the shaft tube. The fiber bundles are laid, or extend, around these retaining pins or between these retaining pins accordingly. As a result, a very good mechanical coupling of the shaft tube consisting of fiber composite material to the connecting elements can be carried out. A pure adhesive would not suffice on account of the insufficient strength for the transmission of very high levels of torque. A disadvantageous drilling through of a shaft tube consisting of fiber composite material for the screw fastening or secure connection to the connecting element would cut through a multiplicity of fiber bundles and therefore bring about a significant weakening of the shaft tube particularly in the connecting region. The provision of the multiplicity of retaining pins, to which very many or advantageously almost all the fiber bundles are directly connected, or indirectly connected via interposed fiber bundles, has the great advantage that a stable connection can be created across the entire thickness of the shaft tube in the connecting region. In the case of a pure adhesive fastening, only the lowermost layers of fiber bundles, which to a greater or lesser extent are adhesively bonded to the connecting element, would bear the forces, whereas the fiber bundles which lie more towards the outside could only absorb and transmit force as a result of the adhesive fastening to the inner fiber bundles.

In an advantageous embodiment of the invention, the connecting elements are of a tubular design, especially being relatively short in comparison to the overall length of the shaft arrangement.

In yet another embodiment of the invention, it is possible that at least one connecting element has a flange-like widened section in the manner of a disk on its free end. This can then be coupled either to a hub or to a generator by a larger diameter than in the case of the shaft arrangement itself. Alternatively, another yet larger disk can be screwed on, or be provided, particularly towards the rotor hub and in turn is then screwed to the hub. It is also possible that both connecting elements have a flange-like widened section.

At least in the overlapping region of connecting element and shaft tube, at least on one side of the shaft arrangement, provision can be made for a conical extension, or the shaft tube is conically flared towards it free end. The connecting element can have a corresponding conical shape by either reducing wall thickness into the conically flared end of the shaft tube or by means of a similarly conical extension. In any case, it should be correspondingly conical on its outer side in the connecting region. As a result of this conicity, the effect of a very good and durable stable force transfer from the connecting elements into the shaft tube being carried out by larger diameters in the connecting region can be achieved. A larger diameter brings about in this case a larger connecting surface for a better connection.

Furthermore, a better transition to a middle region with smaller diameter can be achieved in this way. As a result of this smaller diameter which is provided in the middle region of the shaft tube, the torsional stiffness and also the flexural stiffness can also be reduced a little. As a result, for one thing torque peaks can be compensated and for another thing, with regard to the flexural stiffness, slight deviations of the alignment of hub and generator axis can be compensated without costly and susceptible cardan joints or other compensating joints with movable parts. An outside diameter reduction of the shaft tube between the largest regions at the ends of the shaft tube and the constant middle region can be at least 20%, preferably 30% to 40%. This means that the shaft tube in the middle region is considerably slimmer than at the ends.

Furthermore, such a middle region can have at least 50% of the length of the shaft tube, preferably 60% to 80%. Thus, the aforesaid reduction of the torsional stiffness and also of the flexural stiffness can be better achieved.

In an advantageous embodiment of the invention, the connecting elements, especially also the shaft tube, are rotationally symmetrical around a longitudinal center axis. Thus, a uniform stability and also a concentric running can be achieved.

The retaining pins can basically be fastened or created in a variety of ways. They are advantageously inserted into holes in the connecting elements, especially in the previously described conically tapering regions of connecting element and shaft tube. This is effected particularly advantageously by means of an interference fit, advantageously by the retaining pins having an interference fit with, for example, 5 µm to 50 µm, or approximately 0.05% to 0.2% of the diameter of the retaining pin. Such an interference fit, compared with a screw fastening, has the advantage of easier production and is sufficiently stable since in the main shear forces act upon the retaining pins and no tensile forces act in their longitudinal direction. The alternative possibility of butt welding of retaining pins is seen to be disadvantageous with regard to change of load in respect to torsion of the shaft arrangement. The retaining pins are advantageously cylindrical and elongated and project beyond the connecting elements by a few centimeters.

On the one hand, it is possible to fasten the retaining pins to the connecting elements so that their longitudinal direction extends perpendicularly to the longitudinal center axis of the shaft tube. Especially in the case of a previously described fastening of the retaining pins by pressing into simple holes, these holes can then be produced as simply as possible.

On the other hand, it is possible that the retaining pins are arranged or extend at right angles to the surface or outer side of outer surface of the connecting elements. The holes, into which the retaining pins are pressed, are then to be provided with corresponding orientation, which is also easily possible, however. In this case, the retaining pins, as a result of the abutting fiber bundles and the forces which are exerted by these, are then stressed exactly perpendicularly to their longitudinal direction.

The retaining pins are advantageously uniformly distributed on the connecting element. The retaining pins especially advantageously have in each case constant distances from each other on the one hand in the circumferential direction and on the other hand in the longitudinal direction of the shaft tube. This can possibly also be varied, especially in order to achieve courses of the fiber bundles in the connecting region which are as optimized as possible. A distance in both directions can especially be of a similar size.

In the longitudinal direction of the shaft arrangement, the retaining pins can be provided along 4 to 11 encompassing circular rings. There are especially advantageously seven or eight such rings. Their spacing can lie in the region of the thickness of the shaft tube in the connecting region.

In a further embodiment of the invention, provision can be made in the circumferential direction for 10 to 50 retaining pins, advantageously 25 to 40, around the connecting element. In the case of a previously described conically formed connecting element, the number of retaining pins can reduce as the circumference becomes smaller, but which does not have to be so.

A further considerable advantage of the provision of the retaining pins for the fastening of the fiber bundles lies in or around the fact that the fiber bundles or their ends, as seen from the free end of the shaft tube, behind at least one retaining pin which they are guided past, undergo a change of course, as a partial looping, towards the retaining pin. The fiber bundles advantageously experience a change of course behind a plurality of retaining pins or even behind each retaining pin. It can even be provided that the fiber bundles are applied in such a way that they have such a change of course virtually in the region of each retaining pin which they come past. An overall direction of the fiber bundles can be at an angle to the longitudinal center axis of the shaft tube, which applies anyway when winding such tubes and is also advantageous for the connecting region. Furthermore, the previously described looping around of the retaining pins by means of the fiber bundles can thus be achieved with better effect.

A said change of course of a fiber bundle on a retaining pin can be small. It can indeed even be up to 90°, but it preferably has a turn angle or arc angle of 20° to 60°, especially advantageously of 25° to 45°. Therefore, on the one hand, as a result of the partial looping, a good support of the fiber bundles on the retaining pins, and therefore a good force transmission, are achieved. On the other hand, the specific force transmission characteristics of the fiber bundles, which as a result of excessively frequent and excessively sharp changes of direction are rather impaired, are still taken well into consideration.

In one embodiment of the invention, it can be provided that with each change for course a fiber bundle extends around a retaining pin, or loops around this, in the same direction or with the same turn direction. So that a fiber bundle in the overall direction cannot then deviate too much from a favorable course direction, the previously described looping angle can preferably lie at the said lower limit or even just below it.

In an alternative embodiment of the invention, the changes of course per fiber bundle essentially have a different turn direction each time. This means that the fiber bundles certainly do not have to change their course at each retaining pin but at at least some or most of the retaining pins. Finally, the overall direction of the fiber bundles is changed less sharply, however, for a highest possible stability of the fiber composite material itself and also of the connection to the connecting element. Mixed courses with a different turn direction can also be provided so that the fiber bundles per retaining pin extend around sometimes in one turn direction and sometimes in another turn direction. These fiber bundles can also extend in each case in an exactly opposite manner at an angle to the longitudinal center axis of the shaft arrangement, which is advantageous both for the stability characteristics of the shaft tube and brings about a resulting force action upon the retaining pins in approximately the longitudinal direction of the shaft arrangement.

In a preferred development of the invention, the thickness of the layer which is formed by the fibers which overlap onto the connecting element remains below the length of the retaining pins. The retaining pins can then project a little bit beyond the layer of fiber bundles or the end regions of the shaft tube. It can thus be ensured that even the uppermost fiber bundle, so to speak, does not slip off the retaining pins. In this case, in a further development of the invention, it can be provided that a top layer extends, preferably in an encompassing manner, as a type of collar above the retaining pins. In this way, the effect of fiber bundles slipping off the retaining pins, because they easily work loose, for example, is simply prevented. Such a collar can in turn advantageously consist of a fiber composite material and be wound on in the circumferential direction. Alternatively, the collar can also consist of metal.

In a further development of the invention, it is possible, as previously described, that a still larger flange disk is attached on at least one free end or flange-like end of a connecting element. This connection can advantageously be screw-fastened since higher strength requirements than with welding are then fulfilled. By means of such a flange disk, a connection to rotor hubs, for example, of wind power plants, which quite simply require these diameters, can be carried out. At the same time, the diameter of the shaft arrangement itself can also be minimized, which makes its installation in a finished wind power plant, which is customarily carried out at great height, considerably easier.

During the production process, the fiber bundles, which create the shaft tube, are therefore wound directly onto the connecting elements with the retaining pins or inserted between the retaining pins. The shaft tube is therefore not produced separately from the connecting regions and these parts are then interconnected. Thus, a connection of maximum strength between connecting elements and shaft tube can be created. As a result of the special forming of the shaft tube with the previously described thinner middle region, the previously described desired torsional characteristics and flexural characteristics can be achieved.

The introducing of the fiber bundles between the retaining pins is certainly not exactly trivial but easily possible with modern winding machines. Furthermore, a type of winding or laying of the fiber bundles which is uniform in the circumferential direction should be undertaken in order to create a shaft arrangement which is as uniform and as stable as possible.

In addition to the previously described method for applying the fiber bundles into or between the retaining pins, it is possible in an alternative embodiment of the invention, in simple terms, to first of all apply the fiber bundles to the connecting elements as a lining and only then to introduce the retaining pins between the fiber bundles and into the connecting elements. In this case, the fiber bundles are first of all applied to the connecting element, also to its flared end regions, for example by means of an auxiliary construction for the winding on. In a later or following step, the retaining pins are guided through, or pushed through, the fiber bundles and the fibers of the fiber bundle are displaced in the process. This is preferably carried out while the fibers are still quite moist. The retaining pins are then fastened in holes in the flared connecting element and in the main, especially completely, also penetrate the fiber bundles. In this case, the fiber bundles can be compressed to a greater degree for a higher strength. Above all, however, the winding on of the fiber bundles can be greatly simplified and also carried out more uniformly and more firmly in the process.

In one embodiment of the invention, the holes for the retaining pins are introduced into the connecting element before the winding on of the fiber bundles, preferably by drilling from the outside inward.

Furthermore, it is possible that the retaining pins are basically introduced, or pushed, from the inside outward through the holes into the fiber bundles which are applied to the connecting element. In order to make this easier, the retaining pins can advantageously be tapered or pointed towards the outside, especially with tapers or points which are removable, for example by means of a thread. Thus, the points can be removed after the pushing in of the retaining pins and, as described previously, the retaining pins can be covered.

The retaining pins are advantageously already arranged in the holes before the applying of the fiber bundles without projecting beyond the outer surface or outer side of the connecting element in the process. To this end, the retaining pins have preferably been introduced into the holes from the inside in advance. The retaining pins should especially reach to just before the outer surface of the connecting element in this case, that is to say not protrude. After the applying of the fiber bundles, the retaining pins are then pushed into the fiber bundles from the inside outward.

Furthermore, it is possible to introduce or push the retaining pins from the outside inward into the fiber bundles which are applied to the connecting element, with displacement of the fiber bundles to the side. In this case, the holes have preferably been introduced into the connecting element before the applying of the fiber bundles. Their position is therefore known. After the winding on, the retaining pins are then pushed from the outside inward through the fiber bundles into the holes with an interference fit. In this case, the retaining pins can advantageously be tapered or pointed on the inwardly pointing regions.

If the holes in the connecting element have still not been created before the winding on, then the fibers or fiber bundles can first of all be displaced to the side from the outside in order to create an access channel for the connecting element, for example by means of a tube. Through this access channel, the connecting element is then drilled and a retaining pin is then inserted from the outside inward through the additional channel into the thus produced hole in the connecting element hole with an interference fit. The method of prior drilling is preferred, however.

Furthermore, covering of the free ends of the retaining pins can be carried out at least in the region of retaining pins, preferably by means of an additional layer of applied fiber bundles. This is possible in the case of each of the variants of the embodiments which are described here.

A connecting element as a semi-finished product for the production of a shaft arrangement by a previously described second method is hollow or has an interior space with an inner surface and also a multiplicity of holes into which retaining pins are pushed from the inside. The retaining pins do not project beyond the outer surface of the connecting element and in particular are formed with a taper or point in their end regions. The retaining pins preferably project inwardly beyond the inner surface of the connecting element, especially with more than half their length or with even more than 75% of their length, that is to say project to an appreciable extent.

Apart from the claims, these and further features are also to be gathered from the description and from the drawings, wherein the individual features in each case can be realized on their own or in numbers in the form of sub-combinations in an embodiment of the invention and in other fields and can constitute embodiments which are advantageous and separately protectable, for which protection is claimed here. The division of the application into individual sections and also into guide headings does not limit the statements made under these in their generality.

BRIEF DESCRIPTION OF THE DRAWINGS

Exemplary embodiments of the invention are represented schematically in the drawings and are explained in more detail in the following text. In the drawings:

FIG. 1 shows a simple sectional view through a wind power plant with shaft arrangement between rotor hub and generator, FIG. 2 shows a shaft arrangement corresponding to FIG. 1 enlarged in a sectional view, FIG. 3 shows the shaft arrangement corresponding to FIG. 2 in an oblique view, FIG. 4 shows an enlargement of a left-hand connecting element with conical taper and holes therein, FIG. 5 shows an enlarged view of the left-hand region of the shaft arrangement from FIG. 2, FIGS. 6-11 show different winding courses of the fiber bundles of the shaft tube around retaining pins in the holes on the connecting element.

DETAILED DESCRIPTION OF THE EXEMPLARY EMBODIMENTS

Figure 6:
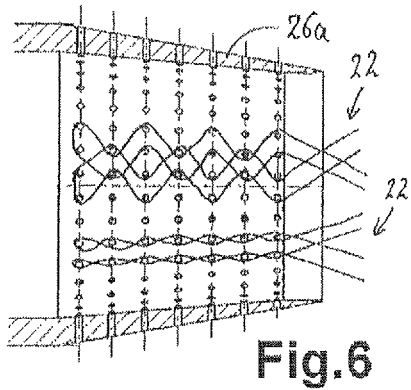

In FIG. 1, a wind power plant 11 is shown greatly simplified in side section. A rotor hub 12 is supported as is customary on the front end of a nacelle 13 which also contains a generator 14. Rotor hub 12 and generator 14 are interconnected in a rotation-resistant manner via a shaft arrangement 16, wherein no joints or other compensating devices at all are advantageously provided.

The shaft arrangement 16 according to the invention is shown enlarged in side section in FIG. 2 and in oblique view in FIG. 3 and has a shaft tube 17 which over a large part of its length 18 is formed by a middle region with constant band thickness and constant overall thickness. To the left, the shaft tube 17 merges via a left-hand transition region 19a into a left-hand conical flare 21a. On the right-hand end, a mirror-symmetrical similar construction is provided, with a right-hand transition region 19b and a right-hand conical flare 21b. The shaft tube 17 consists of a fiber composite material, as is generally known to the person skilled in the art, that is to say consisting of fiber bundles and a matrix material or epoxy resin or the like.

Together with FIGS. 4 and 5, the connecting elements 24a and 24b are explained in more detail in the following text. The left-hand connecting element 24a, which is also shown in an enlargement in FIGS. 4 and 5, has a straight tube section 25a which to the right, that is to say towards the shaft tube 17, has a left-hand conical taper 26a. The angle of the conical taper 26a is approximately 10°. Furthermore, the wall thickness of the connecting element 24a in this case reduces towards the right-hand free end, but which does not have to be so. The holes 27a which are described in the introduction are located in the conical taper 26a. The holes are arranged in the circumferential direction along seven circular rings with an equal distance from each other in each case. Similarly, the holes extend in the direction of the longitudinal center axis L of the shaft arrangement 16 parallel thereto and in this case also have the same distance from each other. The holes 27a are drilled perpendicularly to the longitudinal center axis L, that is to say at an angle of 80° to the outer surface of the conical taper 26a. This does not have to be so, however, the holes can also be drilled into the outer surfaces at right angles and then be at an angle of 80° to the longitudinal center axis L. In the circumferential direction, holes 34 are provided on the conical taper 26a.

To the left, the tube section 25a merges into a left-hand flange 28a, wherein it is still a single part in this case. A large flange disk 30 is then fastened on the left-hand flange 28a via a multiplicity of screws, which is evident from FIG. 3. This flange disk in turn is screwed via outer holes to the rotor hub 12 or to another assembly. Via the very large diameter of the flange disk 30, which in practice can be up to 2 meters or even more, a very good rotation-resistant connection of the shaft arrangement 16 is possible. The diameter of the tube section 25 can then be approximately 75 cm and the taper 26a at the thin end can be just a little over 50 cm. The entire shaft arrangement can be several meters in length, for example 7 m to 10 m. The shaft tube 17 itself in this case can be for example approximately 8 m in length with a middle region 18 of barely 6 m and an inside diameter of 40 cm with a wall thickness of several centimeters, for example 5 cm to 15 cm. The wall thickness of the shaft tube 17 decreases a little towards the outside in the conical flares 21, which is natural after all on account of the widened diameter there. The holes 27 can have a diameter of 1 cm to 2 cm. From FIG. 5, it is also quite evident that with a generally possible constant thickness of the conical taper 26a, the holes 27a which are provided there would have the same length overall.

From the enlargement in FIG. 5, it is to be seen how long cylindrical retaining pins 32a are inserted into the holes 27a with an interference fit, or are driven into the holes. The retaining pins 32a should consist of solid steel. Correspond-ing to the aforesaid diameter of the holes 27a, the diameter of the retaining pins can be 1 cm to 2 cm and their length 8 cm to 12 cm.

If the entire connecting element 24 is provided with the retaining pins 32a, an arrangement like a hedgehog exists. The shaft tube 17 is then constructed by the fiber bundles which are provided for it being introduced into or between the retaining pins 32 and so creating a layer which then ultimately creates the conical flare 21a. Also, the applying of the matrix material in this case is no problem for the person skilled in the art.

From FIG. 5; it is clearly evident that the upper ends of the retaining pins 32a project a bit beyond the left-hand conical flare 21a or beyond the fiber composite material, in fact by the same amount in each case. As a result, the effect of the fiber bundles being able to slip beyond the retaining pins 32a during the winding on and also afterwards, or to slip past these, is to be prevented. As additional security, provision is made for a collar-like cover 34a which covers the ends of the retaining pins 32a. The cover 34a can be a correspondingly conically formed metal ring, or alternatively it is also formed from a fiber composite material and is fixedly wound onto the outer side of the conical flare 21a. In this way, detachment of the fiber composite material of the shaft tube 17 in this region can be avoided.

The construction of the connecting elements is identical except for the slightly smaller right-hand flange 28b.

Different types of winding for the fiber bundles 22 onto the retaining pins 32—which are represented here only by means of their holes 27—on the connecting element 24 or on the conical taper 26 are shown in FIGS. 6 to 11. In FIG. 6 at the top, a plurality of fiber bundles 22 are wound from the outermost retaining pins 32 on the left towards the shaft tube 17 so that they go in an obliquely staggered manner to the retaining pin next to it on the right and one level below it, then again to the retaining pin next to it on the right and one level above it, etc. Furthermore, the fiber bundles 22 coming virtually from the right are guided through the retaining pins 32 all the way to the left and then again to the right, going in an endless manner, that is to say have no free ends. Furthermore, a mirror-symmetrical winding of the fiber bundles 22 in each case is also shown here according to the aforesaid laying pattern, as a result of which the effect of the load of the retaining pins 32 extending virtually as a resultant only to the right along the longitudinal center axis L can be achieved.

Shown in FIG. 6 at the bottom is a winding pattern for the fiber bundles 22 in which a deflection of the fiber bundle around each of the retaining pins 32 is carried out. Whereas the looping angle in the upper representation is approximately 90°, in the lower representation it is only approximately 20°.

Shown in FIG. 7, right at the top, is a winding pattern in which, starting from one retaining pin 32, the fiber bundles 22 are passed around two retaining pins to the right and one level above or below, and which is again mirror symmetrical overall with two fiber bundles 22. Shown in FIG. 7 in the middle is a winding pattern in which this is thus created with two fiber bundles 22 in parallel. In this case, the looping angle is approximately 50° to 60°.

Figure 7:
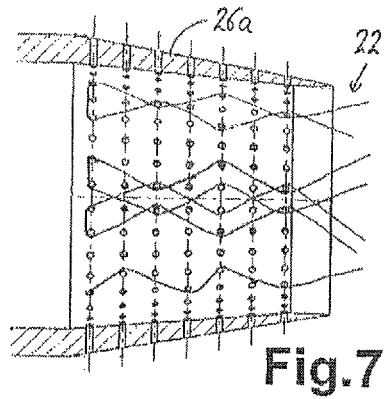

Shown in FIG. 7 right at the bottom is a winding pattern with an individual fiber bundle 22 which goes from one retaining pin 32 one to the right and one level above. Starting from this, the fiber bundle is passed around two retaining pins to the right and one level below.

In the case of the winding patterns shown in FIGS. 6 and 7, the fiber bundles 22 admittedly come obliquely away from the conical taper 26 or the retaining pins 32, but overall extend along a virtually averaged direction parallel to the longitudinal center axis L.

Figure 8:
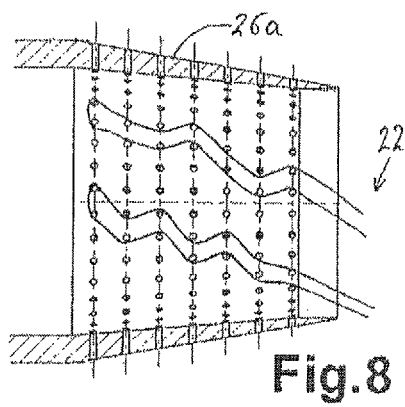

In the case of the winding pattern according to FIG. 8 at the top, it is easy to see that in this case, starting from a retaining pin 32 on the far left, the fiber bundles are passed around two retaining pins to the right and then one level below. Then, the fiber bundles is passed around one retaining pin to the right, then two retaining pins to the right and two levels below, and then again around only one to the right. In this case, the looping angle therefore increases.

In the case of the winding pattern in FIG. 8 at the bottom, starting from a left-hand retaining pin 32, the fiber bundles are passed around one retaining pin to the right and one level below, then one retaining pin to the right, then again one to the right and one level below, etc. In this case, in both winding patterns according to FIG. 8, an averaged oblique course is created. Furthermore, in the case of the lower winding pattern a looping is provided on each retaining pin 32 around which the fiber bundle 22 passes. It changes its turn direction, however, on each retaining pin 32.

Figure 9:
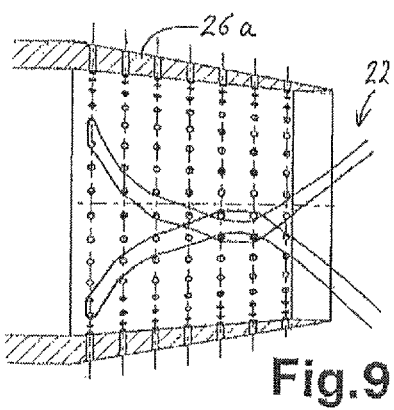

Shown in FIG. 9 is a winding pattern for the fiber bundles 22 in which the turn direction of the looping, starting from the retaining pin on the far left, does not change. However, there is only one relatively small looping of 20° to 30° per retaining pin 32.

Figure 10:
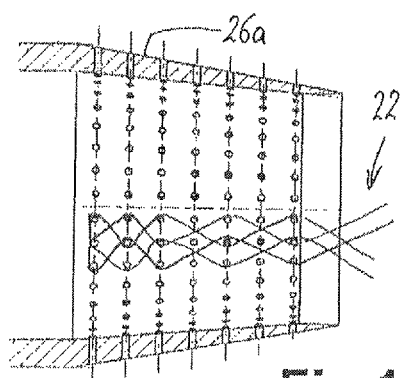

Shown in FIG. 10 is a winding pattern for the fiber bundles 22 in which the direction of looping frequently changes. Furthermore, the looping angle reduces, or becomes smaller, from left to right.

Figure 11:
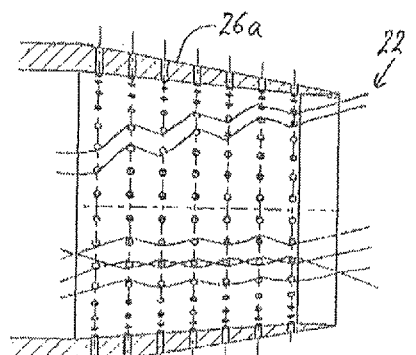

Shown in FIG. 11 is a further winding pattern in which the fiber bundles point to the left with open ends. Shown in FIG. 11 at the top, furthermore, is a winding pattern in which the looping angle is variable depending upon the looping direction, as in FIG. 8 at the bottom. Shown in FIG. 11 at the bottom is a pattern as in FIG. 6, but on the other hand with fiber bundles 22 which are open to the left.

From the numerous possible winding patterns of FIGS. 6 to 11 it is evident that in this case the fiber composite material with the fiber bundles 22 of the shaft tube 17 can be connected to the connecting elements 24 or to their conical sections 26 in multifarious ways and very advantageously. In the most general sense, different winding patterns can also be combined, especially in coatings or layers which alternate one above the other.

Whereas the retaining pins 32 with the different winding patterns have the direction to achieve a connection of the fiber composite material of the shaft tube 17 to the connecting element 24 which is as good, durable and torque-stable as possible, the conical extensions are provided for the shaft tube 17 having the aforesaid considerably reduced diameter in the middle region 18. The conical extension creates a good transition between the regions of different diameter. Admittedly, the wall thickness increases a little as a result. However, the smaller diameter is decidedly positive for a slightly lower flexural stiffness of the shaft arrangement 16 in the middle region 18 and also a slightly reduced torsional stiffness. So, in addition to a possible permanent deviation from the alignment of the connecting elements 24 in relation to each other, suddenly occurring torque peaks between rotor hub 12 and generator 14 can be absorbed a little. As a result, the service life of the parts is significantly increased and very disruptive time spent on maintenance is reduced.

Figure 12:
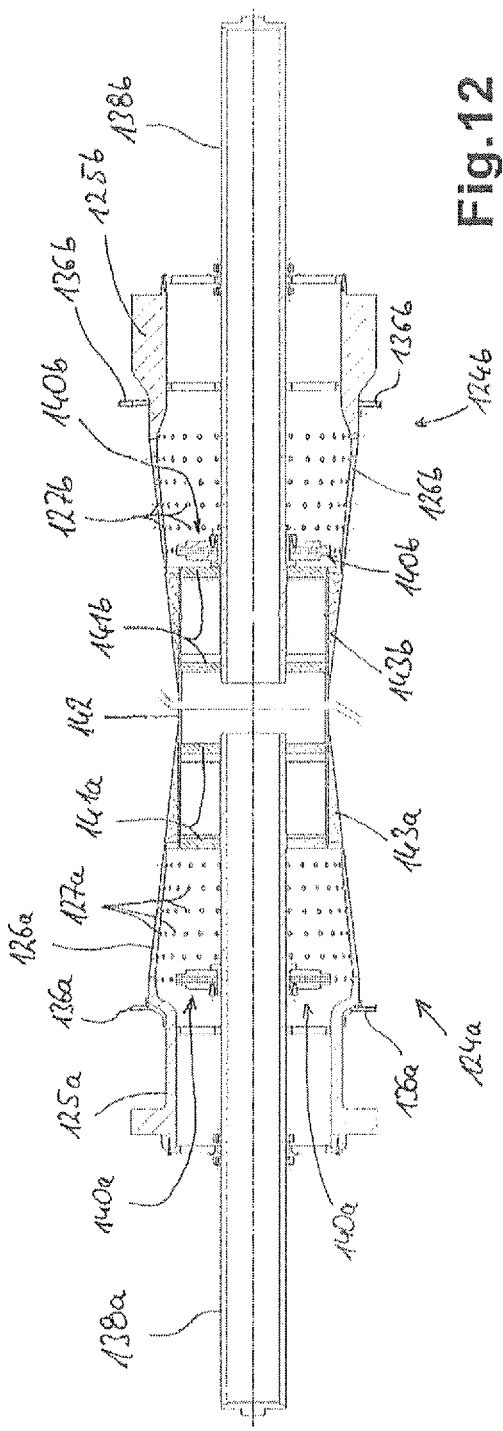
FIG. 12 shows a section through two connecting elements for the applying of fiber bundles for producing a shaft arrangement according to an alternative method.

In FIG. 12 shows the alternative, second production method, in which the fiber bundles are applied to the connecting elements 124a for the rotor and connecting elements 124b for the generator before the retaining pins are yet projecting, that is to say they are not applied into or between the retaining pins. The two connecting elements 124a and 124b are provided for this, having in each case similarly formed conical tapers 126a and 126b and also differently formed tube sections 125a and 125b adjoining them. They are basically formed similar to those of the previous figures. These tube sections, however, are not of interest.

The holes 127a and 127b are provided in the conical tapers 126a and 126b, as already described in principle in relation to the first exemplary embodiment, see also FIG. 4 there in particular. Unlike in the first exemplary embodiment, in this case it is also additionally provided that the wall thickness in the region of the conical tapers 126a and 126b reduces considerably less sharply. This, however, is only to illustrate the basic variation possibilities. The advantage of the wall thickness variation in the case of the conical tapers 126a and 126b lies in the fact that the retaining pins 132 which lie right on the outside at the ends and are loaded to an extremely high degree, are thus unloaded a little since the retaining pins can yield a little more towards the inside on account of the slightly thinner wall thickness. The overall thickness of the lining consisting of fiber bundles and the wall thickness of the connecting element can generally remain more or less constant in the longitudinal direction. The lining can increase its thickness from the outside inward, for example by 20% to 40%.

Retaining pins for the fiber bundles are not shown in FIG. 12 but are to be basically already provided in the holes 127a and 127b. This is explained in more detail in relation to the enlarged detail from FIG. 13.

Furthermore, it is evident in FIG. 12 that so-called auxiliary winding stars 136a and 136b are provided in each case on the outside on the conical tapers 126a and 126b. These are known per se to the person skilled in the art and have a large number of projecting serrations or pins, similar to the outermost ring of retaining pins in FIG. 5 on the far left. These auxiliary winding stars 136a and 136b serve for winding on the fiber bundles according to the previously described method, or they serve as reversal points since of course no retaining pins at all project from the connecting elements 124a and 124b upon which the winding could be undertaken.

The winding angles can vary in this case, wherein winding angles of approximately ±45° could advantageously be dominant.

Inside the connecting elements 124a and 124b, pressing devices 140a and 140b are provided on removable central support tubes 138a and 138b. The pressing devices are movable in each case on the central support tube 138 in the longitudinal direction and in the rotational direction. The pressing devices are explained in more detail in relation to the enlarged view according to FIG. 13.

Towards the inside, the support tubes 138a and 138b have in each case pushed-on support disks 141a and 141b which support a thin support star 142—advantageously as a thin metal tube—which continuously connects the connecting elements 124a and 124b. The support star also supports cone adapters 143a and 143b which create the transition from the rectilinear extent in the middle region of the shaft arrangement to the conical tapers 126a and 126b. Whereas the support tubes 138a and 138b together with the support disks 141 and pressing devices 140 are finally removed, the support star 142 and the cone adapters 143a and 143b can remain therein.

Figure 13:
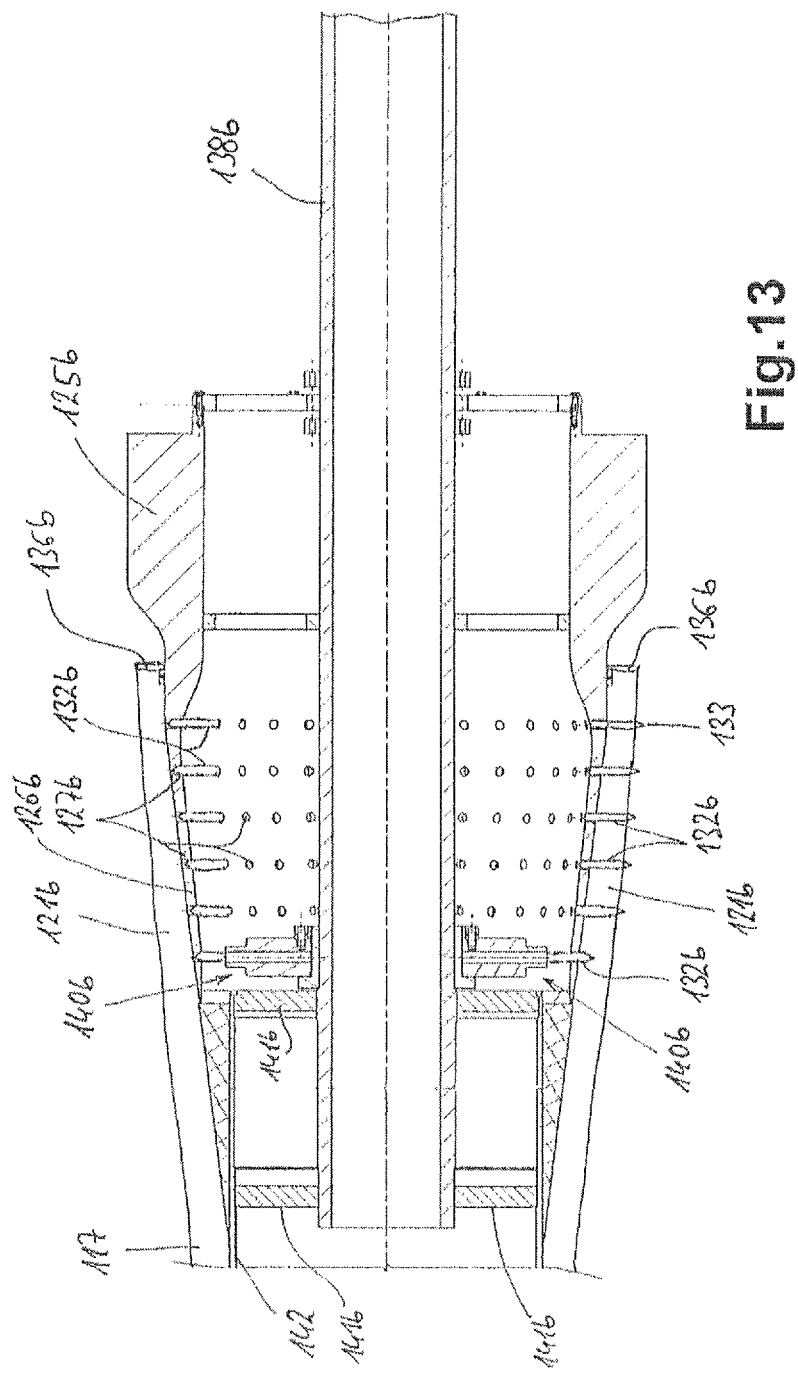

In the enlarged view of the right-hand connecting element 124b according to FIG. 13 for the shaft arrangement 116, the shaft tube 117 together with its right-hand conical flare 121b is also already shown. In the region of the conical flare 121b, the fiber bundles, which are not shown in detail here, form the aforesaid lining on the connecting element 124b or in particular on the conical taper 126b. In the upper region, it is apparent in the enlargement how retaining pins 132b are introduced into the holes 127b, but from the inside and only to the extent that they do not project beyond the outer surface, that is to say do not break through this.

The retaining pins 132b therefore project inwardly with the greatest part of their length. In this state of the connecting element 124b, which is thus also an independent part and feature of the claimed invention, especially with the retaining pins already partially pushed in from the inside, the lining with the fiber bundles for the shaft tube 117 and for the conical flare 121b is then produced, by means of the auxiliary winding star 136b shown on the right, by winding on, as is known per se for the person skilled in the art and as is indeed also previously described in principle.

After the winding on of the fiber bundles, the pressing device 140b, which is arranged on the central support tube 138b, is put into operation. In a way not shown in more detail, but in an advantageous way, by means of a pneumatically, hydraulically or mechanically operable pusher, which in each case is accurately placed radially on the inside of the retaining pins 132b, these are slowly pushed outward through the holes 127b. In the process, these retaining pins 132b bore, so to speak, through the applied lining of fiber bundles, which are pushed to the side. Admittedly, considerable forces are required for this, but these can be applied by means of the corresponding design of the pressing device 140b. This displacement of the fiber bundles has the additional advantage that they are further compressed in this case, so to speak, and an even higher strength can be achieved. The fiber percentage, in the most general terms, can be at least 55% to 70%. During the pushing in, a little resin or binding agent possibly discharges on the upper side, which, however, can be removed without any problem. Naturally, the retaining pins 132b are pushed into these fiber bundles as directly as possible after applying them.

In the bottom region of FIG. 13, it is apparent how all the other retaining pins 132b, with the exception of the retaining pin shown on the far left, are already completely pushed out. They are seated fully in the holes 127b, but by their pointed ends project slightly beyond the conical flare 121b or its outer side. The retaining pin 132b shown on the far left is currently pushed out by means of the pressing device 140b and has not yet quite reached its end position.

Figure 14:
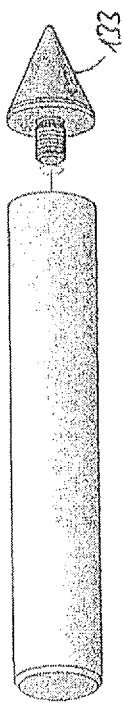
FIG. 13 shows an appreciable enlargement of the right-hand region of the arrangement from FIG. 12 with applied fiber bundles as a lining and partially pushed-through retaining pins and FIG. 14 shows an oblique view of a retaining pin with a point which can be unscrewed.

Such a retaining pin 132b is shown in an enlarged oblique view in FIG. 14. At its end, it has a point 133 which is provided with a thread for screwing into the pin 132, wherein the point, after the complete pushing through corresponding to FIG. 13 at the bottom, can be simply unscrewed. A retaining pin can have an exemplary diameter of 10 mm to 20 mm, advantageously of 18 mm. The point 133 can be approximately 10 mm to 30 mm in length, advantageously approximately 20 mm. The overall retaining pin can be 100 mm in length, for example. The point 133 is very slightly rounded so that during the pushing in the fiber bundles are displaced only to the side as far as possible, but are not penetrated or damaged.

After the unscrewing of the points 133 from the retaining pins 132, a cover, which advantageously again consists of wound-on fiber bundles, can be applied corresponding to FIG. 5.

For the pushing of the retaining pins 132, use can also be made of two pressing devices 140b which are disposed exactly opposite in each case on the support tube 138b. In this way, an improved force distribution and force transfer into the connecting element 124 and into the support tube 138 is achieved.

The previously described variant, not shown here, of introducing the retaining pins into the already applied fiber bundles corresponding to FIG. 13 on the right at the top can seem to be such that since the position of the holes 127 is indeed basically known, the retaining pins with points are fitted in each case from the outside similar to FIG. 14 and are pushed through the fiber bundles. The points assist in this case both in the displacement of the fiber bundles and in the centering in the hole. Since, however, the corresponding fitting of the retaining pins on the outer side of the wound-on lining is seen as being rather difficult, this possibility is indeed provided and conceivable and also technically realizable, but the variant shown in FIGS. 12 to 14 is preferred.

The invention claimed is:

1. A method for producing a shaft arrangement for transmitting torque from a hub of a wind power plant to a generator, the shaft arrangement including connecting elements at both ends thereof for external mechanical coupling or connection on the outside, wherein said connecting elements are overlapped by end regions of a central connecting shaft tube, wherein said shaft tube consists of a fiber composite material with a multiplicity of fiber bundles, and wherein said connecting elements have a multiplicity of projecting retaining pins located in a region which is overlapped by said shaft tube, the fiber bundles extending around said projecting retaining pins, the method comprising the steps of:

applying said fiber bundles to said connecting elements first, and, in a later step, guiding or pushing said retaining pins through said fiber bundles with displacement of said fibers of said fiber bundle, with said fibers moist, and said retaining pins are then fastened in holes in said connecting elements and generally also penetrate said fiber bundles, wherein said retaining pins are pushed from an inside outward through said holes into said fiber bundles which are applied to said connecting element.

2. The method as claimed in claim 1, wherein said holes are introduced into said connecting element before winding on of the fiber bundles.

3. The method as claimed in claim 1, wherein said retaining pins in this case reach to just before said outer surface of said connecting element, and after applying said fiber bundles said retaining pins are pushed from said inside outward into said fiber bundles.

4. The method as claimed in claim 1, wherein said retaining pins are formed with a taper or a point towards an outside.

5. The method as claimed in claim 1, wherein before applying said fiber bundles said retaining pins are already arranged in said holes without projecting beyond said outer surface of said connecting element.

6. The method as claimed in claim 5, wherein said retaining pins have been introduced into said holes from said inside in advance before applying said fiber bundles.

7. A method for producing a shaft arrangement for transmitting torque from a hub of a wind power plant to a generator, the shaft arrangement including connecting elements at both ends thereof for external mechanical coupling or connection on the outside, wherein said connecting elements are overlapped by end regions of a central connecting shaft tube, wherein said shaft tube consists of a fiber composite material with a multiplicity of fiber bundles, and wherein said connecting elements have a multiplicity of projecting retaining pins located in a region which is overlapped by said shaft tube, the fiber bundles extending around said projecting retaining pins, the method comprising the steps of:

applying said fiber bundles to said connecting elements first, and, in a later step, guiding or pushing said retaining pins through said fiber bundles with displacement of said fibers of said fiber bundle, with said fibers moist, and said retaining pins are then fastened in holes in said connecting elements and generally also penetrate said fiber bundles, wherein said retaining pins are introduced or pushed from said outside inward into said fiber bundles which are applied to said connecting element, with displacement of said fiber bundles to the side, wherein before applying said fiber bundles, said holes have been introduced into said connecting element and said retaining pins are pushed from said outside inward through said fiber bundles into said holes with an interference fit, and wherein for producing said holes in said connecting element from said outside, said fibers or fiber bundles are first of all displaced to the side in order to create an access channel to said connecting element, said connecting element is then drilled by means of said access channel and then by means of said additional channel a retaining pin is inserted from said outside inward into said hole in said connecting element with an interference fit.

* * * * *